March 4, 1930.  T. W. CASE  1,749,412
TALKING PICTURE APPARATUS
Filed Dec. 10, 1926
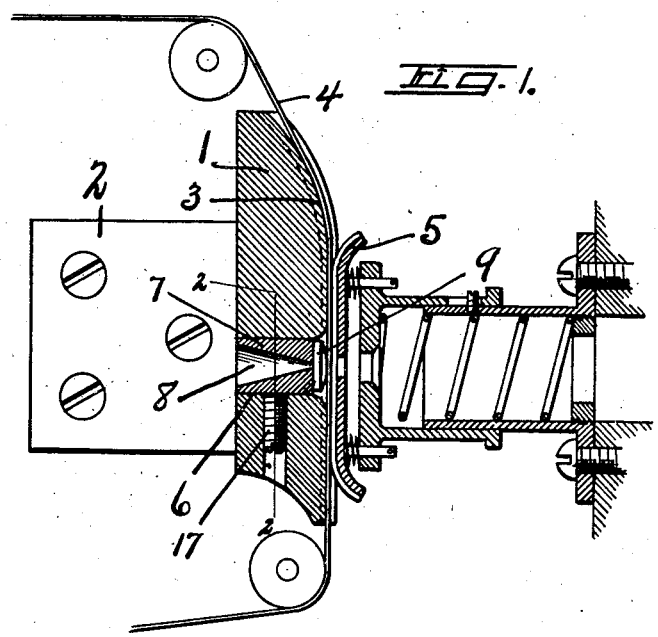
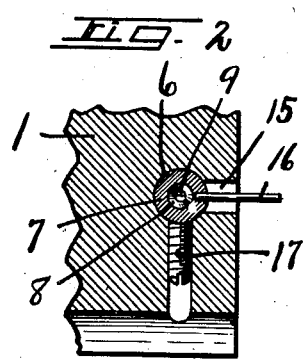
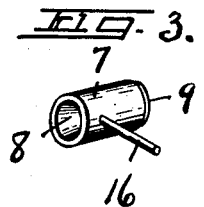
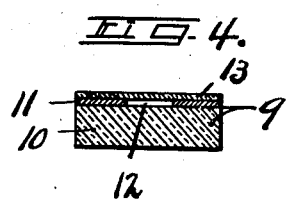
INVENTOR.
Theodore W. Case
BY
Denison Thompson
ATTORNEYS.
WITNESS
H. W. Furst.

Patented Mar. 4, 1930

1,749,412

UNITED STATES PATENT OFFICE

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK

TALKING-PICTURE APPARATUS

Application filed December 10, 1926. Serial No. 154,007.

This invention relates to certain new and useful improvements in talking picture apparatus.

In the reproduction of sound pictures from a film bearing a photographic record of light waves corresponding to sound waves, it is customary to project light through an extremely narrow slot corresponding substantially with the size of the slot through which the picture was taken, and to pass said light through the film record on to a light reactive cell or resistance connected in circuit with suitable sound-producing apparatus.

It is found that in the operation of such apparatus it is quite essential that the slot through which the light is projected should be positioned and maintained in absolute alignment with the lines constituting the sound record upon the film and that there should be provided means for maintaining the slot in the desired proximity to the film.

The main object of this invention is the provision of a structure by means of which the slot or slit through which the light is projected can be positioned in absolute alignment with the sound record lines on the film, and whereby proper adjustment as to proximity may be maintained between the film and the slit.

Other objects and advantages relate to the details of the structure and the parts thereof, all as will more fully appear from the following description, taken in connection with the accompanying drawings, in which:

Figure 1 is a sectional view of an apparatus of this invention.

Figure 2 is a section on line 2—2, Figure 1.

Figure 3 shows the slot supporting unit removed from the structure.

Figure 4 is a horizontal section through the slot unit itself.

The apparatus as shown comprises a body section —1— which may include a flange —2— for securing the same to a moving picture apparatus. The body —1— includes a track —3— over which the film —4— bearing the sound record is adapted to move, the film being held in proper relation with respect to the track by means of one or more spring-pressed shoes —5— in a manner shown in my co-pending applications Serial Nos. 95,593 and 124,723.

Instead of having a slit unit rigidly secured in the track —3—, the body —1— in this illustration is formed with a substantially cylindrical opening —6— adapted to tightly receive a cylinder —7— which has preferably as shown a tapered opening or passageway —8— which decreases in size toward the film. This cylinder —7— carries in any suitable manner what I term a slit unit —9— and which may be of any desired form and shape, and of any desired construction.

As illustrative of one preferred form, this slit unit may comprise a transparent base —10— of quartz, glass or the like having deposited thereon an extremely thin coating —11— of an opaque material, such as metal. A suitable slit —12— is ruled in the metal coating —11— and as before stated, this slit is extremely small, and is preferably of elongated form so as to permit the passage of a line of light corresponding to the lines constituting the sound record upon the film.

The opaque coating —11— with the slit —12— ruled therein is covered by an extremely thin plate —13— of transparent material, such as quartz. This slit unit in vertical section may have its forward face with which the film is adapted to contact, formed along curved lines or as a segment of a cylinder so that the film contacts only with what may be termed the projecting apex of the slot unit with which the slit —12— is preferably substantially aligned.

The body —1— is further formed with an opening or passageway —15— leading through the wall of the body —1— to the opening —6— and a handle or rod —16— having its inner end secured to the cylinder —7— is rockable in this opening to effect rotary movement of the cylinder —7— to thereby absolutely align the slit —12— in the unit —9— which is carried by cylinder —7— with the lines upon the film.

Further, the rod —16— when set screw —17— is withdrawn, is useable to move the cylinder —7— and the slit unit carried thereby toward and from the film, and when the proper position of rotation and axial movement is effected, set screw —17— may be tightened to hold the cylinder in position.

Altho I have shown and described a specific structure as illustrative of a perhaps preferred embodiment of the invention, I do not desire to restrict myself to the details of form, shape or arrangement of the same, as various changes and modifications may be made within the scope of the appended claims.

I claim:

1. A talking picture apparatus, comprising a base having a track over which a film is adapted to slide, a slit-containing member mounted in said base adapted to be rotated about an axis parallel to a beam of light passing through the slit in said member and to be moved toward and from a film sliding on said track, and means for moving said slit-containing member toward and from said film and rotating said member about said axis.

2. A talking picture apparatus, comprising a base having a track over which a film is adapted to slide, a slit-containing member mounted in said base adapted to be rotated about an axis parallel to a beam of light passing through the slit in said member and to be moved toward and from a film sliding on said track, means for moving said slit-containing member toward and from said film and rotating said member about said axis, and means for securely holding said slit-containing member in a pre-determined position.

3. A talking picture apparatus comprising a base having a track over which a film is adapted to slide, a cylindrical slit-containing member having a longitudinal opening adapting the same to pass a beam of light therethrough mounted in said base and adapted to be rotated about its longitudinal axis and to be moved toward and from a film sliding on said track, means for moving said slit-containing member toward and from said film and rotating said member about said axis, and means for securely holding said slit-containing member in a pre-determined position.

In witness whereof I have hereunto set my hand this 22nd day of November, 1926.

THEODORE WILLARD CASE.